United States Patent
Merrifield et al.

(10) Patent No.: US 11,110,563 B2
(45) Date of Patent: Sep. 7, 2021

(54) NON-CONTACT TOOL SETTING APPARATUS AND METHOD

(71) Applicant: RENISHAW PLC, Wotton-under-Edge (GB)

(72) Inventors: Benjamin Jason Merrifield, Stoke Bishop (GB); Edward Benjamin Egglestone, Bristol (GB); Alan James Holloway, Swindon (GB)

(73) Assignee: RENISHAW PLC, Wotton-under-Edge (GB)

( * ) Notice: Subject to any disclaimer, the term of this patent is extended or adjusted under 35 U.S.C. 154(b) by 0 days.

(21) Appl. No.: 16/635,121

(22) PCT Filed: Aug. 31, 2018

(86) PCT No.: PCT/GB2018/052473
§ 371 (c)(1),
(2) Date: Jan. 29, 2020

(87) PCT Pub. No.: WO2019/048833
PCT Pub. Date: Mar. 14, 2019

(65) Prior Publication Data
US 2020/0238468 A1 Jul. 30, 2020

(30) Foreign Application Priority Data
Sep. 5, 2017 (EP) .................... 17189506

(51) Int. Cl.
*B23Q 17/24* (2006.01)
*G01B 11/08* (2006.01)
*G01B 11/24* (2006.01)

(52) U.S. Cl.
CPC .......... *B23Q 17/2485* (2013.01); *G01B 11/08* (2013.01); *G01B 11/24* (2013.01)

(58) Field of Classification Search
CPC .... B23Q 17/2485; G01B 11/08; G01B 11/24; G01B 11/2433
See application file for complete search history.

(56) References Cited

U.S. PATENT DOCUMENTS

| 3,947,129 A | 3/1976 | Wiklund |
| 4,007,992 A * | 2/1977 | Petrohilos ............ G01B 11/046 356/640 |

(Continued)

FOREIGN PATENT DOCUMENTS

| DE | 42 01 385 A1 | 7/1993 |
| EP | 2 241 855 A1 | 10/2010 |

(Continued)

OTHER PUBLICATIONS

Mar. 5, 2018 Extended Search Report issued in European Patent Application No. 17189506.3.

(Continued)

*Primary Examiner* — Deoram Persaud
(74) *Attorney, Agent, or Firm* — Oliff PLC

(57) ABSTRACT

A method for tool measurement using a non-contact tool setting apparatus mounted to a machine tool, which includes a transmitter for emitting a light beam having a beam width and a receiver for receiving the light beam. The receiver generates a beam intensity signal describing the intensity of received light. The method is for measuring a tool having a nominal tool diameter less than the beam width so fully inserting the tool feature into the light beam would only partially occlude the beam. The method includes moving the tool through the beam thereby causing a change in the intensity signal and generating a trigger signal when the intensity signal crosses a trigger threshold. The tool size is derived using the trigger signal generated. Also, a step of applying a tool length correction that accounts for the (Continued)

nominal tool diameter of the tool being less than the beam width.

17 Claims, 7 Drawing Sheets

(56) References Cited

U.S. PATENT DOCUMENTS

| | | | |
|---|---|---|---|
| 4,152,767 A | 5/1979 | Laliotis | |
| 5,105,091 A * | 4/1992 | Igarashi | G01B 11/08 250/559.24 |
| 5,164,995 A | 11/1992 | Brooks et al. | |
| 5,311,291 A | 5/1994 | Cholet | |
| 5,404,022 A * | 4/1995 | Stapleton | B41J 11/48 250/548 |
| 6,496,273 B1 | 12/2002 | Stimpson et al. | |
| 7,253,910 B2 * | 8/2007 | Takayama | G01B 11/08 250/559.13 |
| 2003/0060919 A1 * | 3/2003 | Stimpson | G01B 11/27 700/159 |
| 2005/0167619 A1 * | 8/2005 | Stimpson | B23Q 17/2485 250/559.14 |
| 2009/0051933 A1 * | 2/2009 | Stimpson | G01B 11/024 356/614 |
| 2020/0180095 A1 * | 6/2020 | Egglestone | B23Q 17/10 |
| 2020/0198081 A1 * | 6/2020 | Holloway | G02F 1/113 |

FOREIGN PATENT DOCUMENTS

| | | |
|---|---|---|
| EP | 1 587 648 B1 | 11/2013 |
| GB | 1 596 457 A | 8/1981 |
| GB | 2 181 541 A | 4/1987 |

OTHER PUBLICATIONS

Oct. 8, 2018 International Search Report issued in International Patent Application No. PCT/GB2018/052473.

Oct. 8, 2018 Written Opinion of the International Searching Authority issued in International Patent Application No. PCT/GB2018/052473.

* cited by examiner

NON-CONTACT TOOL SETTING APPARATUS AND METHOD

The present invention relates to non-contact tool setting apparatus and particularly to an improved method and apparatus for measuring the length of tools having a diameter less than the beam width of the non-contact tool setting apparatus.

Break-beam tool setting devices for use on machine tools are known, for example see U.S. Pat. No. 6,496,273. Tool setting apparatus of this type includes a light source which generates a beam of light which is passed to a light detector. During a tool setting operation, the machine tool is operated to move a tool into and out of the light beam. Interruption of the light beam by the tool is detected by analysis of the detector output signal and the apparatus generates a so-called "trigger signal" to indicate to the associated machine tool that the light beam has been broken. This arrangement allows tool size, such as the tool length and/or tool diameter, to be measured.

The machining process implemented by a modern machine typically uses a variety of different tools. A large cutting tool can be used to remove the excess stock material from the part and then multiple smaller, finishing, tools used to produce the intricate, fine details. The end forms of cutting tools can also vary depending upon the intended function. For example, end mills can have flat bottoms and/or a radius, drills typically have a 118° or 120° end form whilst spot or chamfering tools typically have a 90° end form. The above described tool setting apparatus can be used to measure the length of the various tools and the measurement accuracy will affect the overall accuracy of the part being cut. In particular, any errors in the measured lengths of different tools can lead to variations in the final size of the part which in turn may mean the part does not meet the required specification and has to be scrapped.

As mentioned above, a non-contact tool setting apparatus issues a trigger signal to the machine tool controller when the light beam is obscured. Typically, this trigger signal is issued when the light level reaches a fixed percentage (e.g. 50%) of the "beam clear" state (i.e. when a fixed percentage of the optical beam is blocked from reaching the detector). To date, tool length measurement errors have been minimised by designing the optical layout of the tool setter apparatus such that the beam size at the tool sensing region is as small as possible. This is done in an attempt to ensure that even the smallest finishing tools will have a diameter no less than the beam width so that they can substantially occlude the beam of light when placed therein. The need to form such narrow (focussed) light beams has the disadvantage that complicated and expensive optical designs are required that can also result in unreliable operation within a machining environment. For example, the tight focussing of the laser beam needs to be checked regularly because the focus can easily be lost due to contamination or misalignment of the optical elements. In some instances, the measured tools are still smaller than the focussed beam and an error is thus inevitably introduced into the length measurements.

According to a first aspect of the invention there is provided a method for tool length measurement using a non-contact tool setting apparatus mounted to a machine tool, the non-contact tool setting apparatus comprising a transmitter for emitting a light beam having a beam width and a receiver for receiving the light beam, the receiver generating a beam intensity signal describing the intensity of received light, the method being for measuring a length of a tool having a nominal tool diameter less than the beam width such that fully inserting the tool into the light beam only partially occludes the light beam, the method comprising the steps of;
  (i) moving the tool through the light beam thereby causing a change in the beam intensity signal,
  (ii) generating a trigger signal when the beam intensity signal crosses a trigger threshold, and
  (iii) determining the length of the tool using the trigger signal generated in step (ii),
  characterised in that the method comprises a step of applying a tool length correction that accounts for the nominal tool diameter being less than the beam width.

The first aspect of the present invention thus relates to a method for tool length measurement using a non-contact tool setting apparatus mounted to a machine tool. The non-contact tool setting apparatus comprises a break-beam type tool detection system in which a light beam (e.g. a laser beam) emitted from the transmitter (e.g. by a laser diode of the transmitter) is passed through a region of free space to the receiver. The light beam generated by the transmitter has a certain beam width, for example a certain beam diameter in the case of a circular or elliptical cross-section beam. The receiver detects (e.g. using a photodiode) the received light and generates a beam intensity signal describing the intensity of the received light.

The method of the present invention is for measuring the length of a tool (e.g. a micro-tool) that has a nominal tool diameter less than the beam width. Such a tool would thus only partially occlude the light beam even when it is fully inserted in the beam (i.e. when extending from one side of the beam to the other). A step (i) comprises moving the tool through the light beam. In other words, the machine tool which holds the tool is programmed to drive the tool relative to the light beam so that the tool moves into, or out of, the light beam. This movement through the light beam causes a change in the beam intensity signal that is generated by the receiver because the amount of the light beam being obscured by the tool is altered by the tool movement. It should be noted that the measurement process may comprise the tool being moved into the beam (a so-called "light-to-dark" measurement) or out of the beam (a so-called "dark-to-light" measurement).

The step (ii) of generating a trigger signal involves monitoring the beam intensity signal (e.g. using a trigger unit) to assess when it crosses a trigger threshold. In other words, a trigger signal is generated that indicates the beam intensity has crossed a trigger threshold. This trigger signal is used to indicate that a tool is located at a certain position within the light beam. In the case of a "light-to-dark" measurement the trigger signal is generated when the beam intensity signal drops below a certain trigger threshold. The generated trigger signal is then passed (issued) to the machine tool which records the position of the tool at the time the trigger signal is issued; i.e. the machine tool records it axes positions, which is often termed "freezing the scales", on receipt of the trigger signal issued by the non-contact tool setting apparatus. It should be noted that there may be a delay between generation and issuance of a trigger signal but, if the delay is substantially constant, this can be accounted for by suitable calibration. The trigger signal is thus used to indicate to an associated machine tool that the tool tip is located at a certain position within the light beam. As is known in the art, the trigger signal may comprise a voltage level change or a voltage pulse that is fed to the SKIP input of a machine tool controller.

Alternatively, the trigger signal may be output to the machine tool as a digital data packet (e.g. using the technique described in our British patent application 1700879.8). The above thus allows, with suitable calibration, the step (iii) to be performed of determining the length of the tool.

The invention is characterised by the step of applying a tool length correction that accounts for the nominal tool diameter being less than the beam width. In other words, the tool length is corrected to take account of the fact that any tools having a tool diameter less than the beam width will not fully obscure the beam even when they are fully inserted into it (i.e. because they are not as wide as the light beam). The applied tool length correction thus compensates for the tool length error that would otherwise arise when the nominal tool diameter is less than the beam width. As explained below, the tool length correction may be calculated and performed in a variety of ways (e.g. by adjusting the trigger threshold or trigger delay or by applying a length adjustment or offset to an uncorrected tool length measurement).

The present invention thus overcomes a problem with prior art non-contact tool setting apparatus that exhibit measurement inaccuracies when the nominal diameter of a tool is less than the beam width. As explained in more detail below, such measurement errors arise in prior art systems because it is necessary to insert a smaller diameter tool further into the light beam before the beam intensity signal drops to a certain level. This has led to prior art apparatus including focussing optics that minimise beam width to try to ensure the tool is always wider than the light beam. The present invention overcomes the need for such expensive and high-maintenance focussing optics and allows accurate tool length measurements to be performed with wider light beams that are less tightly focussed. For example, small aperture gently collimated beams (i.e. small aperture low numerical aperture beams) may be used. The use of more compact (e.g. less tightly focussed) optical arrangements also makes it easier to protect such optics from contamination in the machine tool environment.

The tool length correction that is applied in the method of the present invention may be established in a variety of different ways. In one embodiment, the step of applying a tool length correction comprises referring to a previously derived calibration equation or look-up table. As explained in more detail below, the calibration equation or look-up table may be generated from a series of prior measurements taken when different width tools or calibration pins are inserted into the light beam. For example, a calibration equation may be established from the output of a numerical (e.g. least-squares) fit that relates tool length corrections to a set of tool width indicative measurements for a range of tools of different widths. Substituting a tool width indication into the calibration equation would then provide the tool length correction. A look-up table may also be provided that comprises a discrete set of calibration equation values. Instead of using physical measurements, the calibration equation or look-up table may alternatively be generated from an optical model of the apparatus.

The method may additionally include an initial or calibration step (e.g. performed before any measurements of the tool are taken or as part of the initial measurement) of deriving the above described calibration equation or look-up table. This calibration process may be performed by measuring the lengths of a plurality of tools or objects of different widths. In particular, the length of various tools of known width may be measured using the non-contact tool setting apparatus and a separate (reference) length measurement sensor (e.g. a video sensor). The length error as a function of tool width may then be described using a mathematical function (e.g. a polynomial) or a look-up table (e.g. a set of values derived from a mathematical function). An example of a process suitable for taking measurements and establishing a calibration equation or look-up table is described in more detail below.

The tool length correction that is applied may be calculated by analysing the beam intensity signal that is measured as the tool moves through (e.g. enters and/or leaves) the light beam. In other words, a property of the beam intensity signal (e.g. a feature of the s-curve) that is characteristic of the tool diameter is measured for the tool and then used to determine the tool length correction that is applied. For example, a gradient of a variation (e.g. drop) in the beam intensity signal (e.g. the gradient of a selected part of the s-curve described below) may be used as a calibration equation variable to calculate the tool length correction to be applied.

In an alternative embodiment, the remnant light level is used as the property of the beam intensity signal that indicates the effective tool diameter. The remnant light level may be the absolute beam intensity signal with the tool fully inserted into the light beam or the change in beam intensity between the beam clear level and the remnant light level. The remnant light level has been found to provide a reliable measure of (effective) tool diameter (noting that, as described below, it typically describes tool diameter relative to beam width). The remnant light level may thus be used as a calibration equation variable to calculate the tool length correction to be applied. The step of applying a tool length correction may thus comprise measuring the remnant beam intensity signal when the tool is fully inserted into the light beam thereby partially occluding the light beam. As explained in more detail below, a tool length correction can be applied based on the measured remnant light level, even if the actual tool diameter and beam width are not separately known.

It is typically preferable to be able to calculate and apply the required tool length correction using a single pass of the tool through the light beam. However, the tool measurement process may alternatively be performed in two steps or passes. In a first step, the tool may be fully inserted into the light beam thereby partially occluding the light beam. The remnant light level resulting from the full insertion of the tool into the light beam may then be used to indicate the tool diameter. Based on this indication of tool diameter, the tool length correction to be applied during a subsequent re-insertion of the tool into the light beam can be established. The selected tool length correction may then be implemented (e.g. by adjusting a trigger threshold or trigger delay as described below) either during withdrawal of the tool from the light beam or during a subsequent second pass of the tool into the light beam.

As explained in more detail below, variations in beam width have a similar effect as variations in tool diameter on the change in beam intensity that occurs as the tool is moved through the light beam. In some instances, it may simply be possible to assume the beam width is invariant. However, there are likely to be some changes in beam width over time or if the calibration process is performed on a different tool setter to the one used to measure the tool. The step of applying a tool length correction may comprise determining the nominal tool diameter relative to the beam width. Advantageously, the step of applying a tool length correction comprises a step of assessing the beam width of the light beam. The beam width assessment may be done with separate equipment (e.g. a beam profiler) before or after installation on the machine tool. Alternatively, the method may include an initial step of using the non-contact tool setting apparatus to measure the beam width. The method of beam width measurement may comprise loading an object having an edge into the spindle of the machine tool and using the machine tool to move the spindle relative to the non-contact tool setting apparatus so that the edge of the object passes through the light beam. The beam width of the light beam may then be determined using the beam intensity signal generated at a plurality of positions as the edge is moved through the light beam. Such a technique is described in detail in our co-pending PCT patent application that claims priority to European patent application number 17189509.7.

Returning to how the tool length correction can be performed for tool measurements, it was mentioned above that in a preferred embodiment the tool length correction can be implemented by adjusting the trigger threshold by an appropriate amount. It should firstly be noted that the trigger threshold may be defined in a variety of ways; for example, as a percentage of received light relative to the light received when no object is present in the light beam (i.e. the so-called "beam clear" condition) or as a voltage level. The step of applying a tool length correction may thus comprise appropriately adjusting the trigger threshold (whether it be defined as a voltage level, percentage etc) that is applied in step (ii). As explained above, the amount of trigger threshold adjustment that is required for a particular tool being measured can be determined by establishing a factor related to tool diameter from a characteristic property of the beam intensity signal generated during step (i). The modified trigger threshold that is used in step (ii) to implement the tool length correction may then be derived from a mathematical expression that relates the factor related to tool diameter to the applied trigger threshold. In other words, the mathematical expression can be used to calculate the trigger threshold required for the particular diameter of tool being measured.

The above described adjustment of the trigger threshold (i.e. to implement the tool length correction) allows the issued trigger signal to indicate the tool tip is located at a certain position within the light beam (e.g. the large tool plane) irrespective of tool diameter. In this manner, a trigger signal can thus be issued when the tips of tools of different diameter are located at substantially the same position within the beam. In other words, the trigger threshold may be adjusted (e.g. increased or reduced) so that the amount of obscuration of the light beam required for a trigger signal to be generated is reduced for smaller tool diameter. Instead of calculating each modified trigger threshold directly from a mathematical expression, the trigger threshold may alternatively be set by referring to a look-up table derived from data sets generated from such an expression or from previous measurements of differently sized tools or reference artefacts of known size or length. To a good approximation, the trigger threshold may be set, for a particular tool, in the region of halfway between the beam-clear level and the remnant light level that occurs when the tool is fully inserted through the beam. It has been found that such a technique is tolerant to tool offset errors, in addition to avoiding the need for prior calibration measurements or beam width compensation (i.e. normalisation), as described in more detail below.

The tool length correction can alternatively be implemented by adjusting the trigger delay, assuming the tool feed-rate during measurement is known or can be assumed to be constant. In non-contact tool setting apparatus, there will always be a time delay (due to the speed of electronic processing, the use of trigger filters to suppress false triggers etc) between the light beam being obscured by the required amount and the issuance of the trigger signal to the machine tool. The trigger delay is normally a constant value (i.e. it introduces a velocity dependent error), which allows its effect on tool length measurements to be removed by calibration. It is, however, also possible to adjust (i.e. vary) the applied trigger delay to implement any required tool length correction. Step (ii) may thus comprise providing a trigger delay between the beam intensity threshold being crossed (thereby generating a trigger signal) and the issuance of the trigger signal to the machine tool. The step of applying a tool length correction may thus conveniently comprise adjusting (i.e. varying) the trigger delay. In particular, the applied trigger delay is preferably reduced for smaller diameter tools.

If the trigger delay is to be reduced for smaller tools, then it may be necessary to provide a slightly longer trigger delay for large tools (i.e. tools of a diameter greater than the beam width); this is simply to ensure the trigger delay can be reduced by a sufficient amount to provide the required tool length correction. Reducing the trigger delay effectively means the machine tool receives the trigger signal sooner (i.e. when less of the light beam is obscured) for smaller diameter tools than it would if the trigger delay was unaltered and thereby prevents such tools being erroneously measured as being shorter than they actually are. The reduction in trigger delay thus accounts for the reduced light beam obscuration resulting from the tool diameter being less than the beam width.

The above described methods of implementing the tool length correction may be performed by applying a tool length correction (e.g. varying the trigger delay or trigger threshold) so that the machine tool determines a corrected tool length using the received trigger signal. In particular, the step of applying a tool length correction causes the trigger signal to be issued when tools having different tool diameters are located at substantially the same position within the light beam. The reduced obscuration of light resulting from measuring a smaller diameter tool is thus corrected by adjusting the generation of the trigger signal (e.g. by altering the trigger threshold or trigger delay).

Instead of altering the trigger threshold or trigger delay, a tool length correction value may be established for correcting the tool length measurement made by the machine tool. Advantageously, step (iii) comprises calculating an uncorrected tool length. Step (iii) may then further comprise a step of determining the tool length by applying a tool length correction value (i.e. based on a value related to tool diameter) to the uncorrected tool length. In this case, the step of applying a tool length correction comprises calculating a tool length correction value (e.g. a length correction value in micrometres or millimetres). A tool length may thus be determined in accordance with the prior art and an extra step may then be performed of calculating a tool length correction value. The calculation of the tool length correction may be performed by the controller of the machine tool, or a computer interfaced to the controller, to allow the tool length that will be used by the machine tool in subsequent cutting actions to be automatically updated.

The above described methods could, of course, all be applied when measuring tools having a diameter greater than the beam width, although the tool length correction would then be calculated as zero. Alternatively, the above methods may only be implemented when tools having a diameter less than the beam width are to be measured. The non-contact tool setter may thus be switchable between a small tool mode that uses the above described methods and a large tool mode in which conventional tool length measurements are acquired.

The step of applying a tool length correction may comprise calculating the tool length correction by referring to a calibration equation or look-up table that describes a relationship between the required tool length correction and tool diameter. The calculation of the tool length correction may be determined using a calibration equation or look-up table. The calibration equation or look-up table may have been generated by a purely mathematical process. Conveniently, the calibration equation (calibration function) or look-up table is derived from prior measurements.

The method may further comprise the step of retrieving (e.g. from a remote database or data storage medium) a calibration equation or look-up table that describes a relationship between the tool length correction and tool diameter. Advantageously, the method comprises the initial step of deriving the calibration equation or look-up table. The calibration equation or look-up table may be generated by a purely mathematical (theoretical) process (e.g. using an optical model). Advantageously, the step of deriving the calibration equation or look-up table comprises measuring the change in the beam intensity signal that occurs as a plurality of tools of different width are moved through the light beam. In particular, the step of deriving the calibration equation or look-up table may comprise identifying a feature related to tool diameter from the change in the beam intensity signal that occurs when each of the plurality of tools are moved through the light beam. The step of deriving the calibration equation or look-up table may further involve using an additional sensor (e.g. a camera) to provide an independent measurement of tool tip position (i.e. to establish the tool length correction required for different width tools). It should be noted that the step of deriving the calibration equation or look-up table need not be performed on the same non-contact tool setting apparatus on which the steps (i) to (iii) of the method are performed. In fact, as explained in detail below, a calibration equation or look-up table may be derived that can be used with a plurality of nominally similar non-contact tool setting apparatus.

The step of applying the tool length correction may be performed by at least one of the non-contact tool setting apparatus, the machine tool, an ancillary computer or a bespoke calculation unit. Preferably, the step of applying a tool length correction is performed, at least partially, by the non-contact tool setting apparatus (e.g. by a processor of such apparatus). Advantageously, the step of applying the tool length correction is performed entirely by the non-contact tool setting apparatus. Conveniently, the machine tool comprises a controller and the step of applying a tool length correction is performed, at least partially, by the controller. The tool length correction process may thus be performed by any suitable component of the system. For example, the non-contact tool setting apparatus may have an adjustable trigger threshold or adjustable trigger delay and be arranged to receive correction information from the machine tool controller that allows the adjustable trigger threshold or adjustable trigger delay to be set appropriately. The nominal tool diameter may then be passed to the non-contact tool setting apparatus by the machine tool controller thereby allowing the non-contact tool setting apparatus to calculate the trigger threshold or trigger delay appropriate for a tool of such diameter. Alternatively, the machine tool controller may calculate a required trigger threshold or trigger delay based on tool diameter and beam width and pass this information to the non-contact tool setting apparatus. It would also be possible for the non-contact tool setting apparatus to be programmable directly by a user and/or for it to be controlled by a separate interface or computer that may also be interfaced to the machine tool controller. The skilled person would be aware of the many various ways in which the present method could be implemented.

The present invention can be used with any non-contact tool setting apparatus. An advantage of the present invention is that it permits small tools to be measured using substantially collimated or gently collimated (instead of tightly focussed) light beams. For example, the light beam may have a numerical aperture (NA) of less than 1/65. The light beam may be produced by passage through a small aperture (e.g. a 0.6 mm pinhole may be used with red light to form a beam waist at a distance of 20 mm to 200 mm from the aperture). The method is thus preferably performed using apparatus in which the light beam is a substantially collimated light beam. A substantially collimated beam has a substantially constant beam width along its length, thereby reducing the need to place tools within a certain tight focal length of the focussing optics. The invention also permits wider beams to be used; for example, beams having a width of greater than 0.5 mm, greater than 1 mm, greater than 2 mm or greater than 3 mm or greater than 5 mm or greater than 10 mm could be used. The method may also be used with, and will improve the performance of, focussed beam systems.

The method may be used to determine the length of any suitable tool. As outlined above, the tool may be a micro-tool. For example, the tool may have a tool diameter less than 1.0 mm, less than 0.5 mm, less than 250 µm or less than 100 µm. The tool diameter may be less than 90% of the beam width, less than 80% of the beam width, less than 75% of the beam width, less than 60% of the beam width, less than 50% of the beam width, less than 30% of the beam width, less than 20% of the beam width or less than 10% of the beam width. It should be noted that tool width as used herein relates to the width of the main cutting portion of the tool (e.g. the width of the fluted cutting portion of a drill bit and not any wider proximal end of the tool that is provided for the purpose of retaining the tool in a tool chuck). The tool length may be measured relative to a datum point on the machine tool spindle (i.e. it may be an effective tool length or tool offset rather than an accurate measurement of the physical tool length). The tool may be stationary during measurement (e.g. if preferably rotationally orientated for maximum obscuration of the light beam). Alternatively, the tool may be rotating during measurement. If the tool is rotating, minima in the beam intensity signal may be analysed (e.g. in the manner described in EP1587648).

Although the above relates to measuring the length of a tool, this is just one example of measuring a size of a tool feature. A tool width (e.g. the diameter of one or more cutting teeth) may also be determined. The measurements may be repeated at multiple points on a tool (e.g. a diameter may be measured at a plurality of points along the length of the tool).

In addition to applying a tool length correction, the method may also account for changes in the "beam-clear" condition. In particular, the method may include a step of applying an adjustment to account for any variation in the intensity of light received at the receiver when no tool is located in the light beam relative to a reference light level. Making such an adjustment means that any variations in the intensity of light received at the receiver in the beam-clear condition (i.e. when there is no tool located in the beam) can be compensated for. In particular, the adjustment allows account to be taken of any variations in the intensity of light received at the receiver in the beam-clear condition (i.e. when no tool is obscuring the light beam) relative to a reference light level (e.g. a beam clear light level previously established during installation or calibration of the apparatus). Such variations in light intensity may arise from, for example, coolant mist that is present within the machine tool during use, temperature changes that alter the laser output intensity or small amounts of dirt or contamination on components of the receiver and/or transmitter that are in the optical path of the light beam.

The adjustment to account for changes in the "beam-clear" condition may be implemented in a variety of ways. For example, changes may be made to any one or more of the trigger threshold, transmitted light intensity, or receiver sensitivity etc. If the adjustment comprises adjusting the trigger threshold, then such an adjustment may be in addition to any alteration of the trigger threshold required to implement the tool length correction. An output may also be provided that indicates the magnitude of the adjustment (e.g. the change in laser power, receiver gain, trigger threshold etc) being applied. This ensures that the machine tool user is aware of the magnitude of the adjustment being applied by the compensation unit. A compensation unit may be provided to implement the adjustment.

The non-contact tool setting apparatus used in the method may comprise discrete transmitter and receiver units that can each be attached to a bracket. Alternatively, a single unit may be provided that comprises the transmitter and receiver. The apparatus may include a controller separate to the transmitter/receiver unit(s) or the controller may be formed integrally with such units. Advantageously, the transmitter comprises a laser for generating light. The transmitter may also comprise optics for providing a collimated light beam. Alternatively, the transmitter may provide a focussed (rather than collimated) laser beam.

According to a second aspect of the invention, an apparatus is provided for performing non-contact tool measurement on a machine tool, the apparatus comprising; a transmitter for emitting a light beam having a beam width, a receiver for receiving the light beam and generating a beam intensity signal describing the intensity of light received at the receiver, and a trigger unit for analysing the variation in the beam intensity signal that occurs when a tool having a nominal tool diameter is moved through the light beam, the trigger unit generating a trigger signal when the beam intensity signal crosses a trigger threshold, the trigger signal being usable by the machine tool to determine a length of the tool, characterised in that the apparatus comprises a tool length correction unit that applies a tool length correction when the nominal tool diameter is less than the beam width. The apparatus may include any one or more features described above in the context of the analogous method. Advantageously, the tool length correction unit applies the tool length correction by adjusting the trigger signal that is issued by the trigger unit. For example, the tool length correction unit may apply the tool length correction by adjusting the trigger threshold of the trigger unit and/or by delaying issuance of the trigger signal to the machine tool.

As mentioned above, a housing may be provided for mounting within the working environment of a machine tool, the housing containing the trigger unit and at least one of the transmitter and receiver. The tool length correction unit may also be provided in the housing. Alternatively, the tool length correction unit may be provided as a separate unit or as part of the machine tool (e.g. as a module implemented by the machine tool controller). A compensation unit, as described above, may also be included. It should be noted that the term "unit" as used herein should not be read as being limited to a discrete element or set of components present in one physical location; such a "unit" may be implemented by distributed components or even by software running on one or more processors.

Also described herein is a non-contact tool setting apparatus comprising a transmitter for emitting a light beam and a receiver for receiving the light beam. The receiver may also generate a beam intensity signal describing the intensity of light received at the receiver. A trigger unit may be provided for analysing the beam intensity signal whilst an object is moved through the light beam. The trigger unit may also be for generating a trigger signal when the beam intensity signal crosses a trigger threshold. The trigger unit may have an adjustable trigger threshold. The trigger threshold may be defined as a proportion of the beam intensity signal that is received in the "beam-clear" state. The trigger unit may be arranged to adjust the trigger threshold based on a size of the object being moved through the light beam. The trigger unit may apply a first trigger threshold when measuring objects having a diameter greater than the width of the light beam. The trigger unit may apply a second trigger threshold when measuring objects having a diameter less than the width of the light beam, the second trigger threshold being different to (e.g. higher than) the first trigger threshold.

Also described herein is non-contact tool setting apparatus for a machine tool, comprising; a transmitter for emitting a light beam having a beam width, a receiver for receiving the light beam and generating a beam intensity signal describing the intensity of light received at the receiver, and a trigger unit for analysing the variation in the beam intensity signal that occurs when a tool having a nominal tool diameter is moved through the light beam, the trigger unit generating a trigger signal when the beam intensity signal crosses a trigger threshold, the trigger signal being usable by the machine tool to determine a tool size, wherein a tool size correction is applied to the determined tool size when the nominal diameter of the tool is less than the beam width, the correction being calculated from the beam width relative to the nominal tool diameter.

Also described herein is a method for tool length measurement using a non-contact tool setting apparatus mounted to a machine tool, the non-contact tool setting apparatus comprising a transmitter for emitting a light beam having a beam width and a receiver for receiving the light beam, the receiver generating a beam intensity signal describing the intensity of received light, the method comprising the steps of; (i) moving a tool having a tool diameter through the light beam thereby causing a change in the beam intensity signal, the tool diameter being less than the beam width, (ii) generating a trigger signal when the beam intensity signal crosses a trigger threshold, and (iii) determining a length of the tool using the trigger signal generated in step (ii), wherein the method comprises a step of applying a tool length correction that accounts for the nominal tool diameter being less than the beam width. The tool length correction may be dependent on the relative size of the tool diameter and the beam. The tool length correction may be applied using any of the methods described above (e.g. altering trigger delay, trigger threshold etc).

Also described herein is a method for tool measurement using a non-contact tool setting apparatus mounted to a machine tool, the non-contact tool setting apparatus comprising a transmitter for emitting a light beam having a beam width and a receiver for receiving the light beam, the receiver generating a beam intensity signal describing the intensity of received light, the method being for measuring a tool comprising a tool feature having a nominal tool diameter less than the beam width such that fully inserting the tool feature into the light beam would only partially occlude the light beam, the method comprising the steps of; (i) moving the tool feature through the light beam thereby causing a change in the beam intensity signal, (ii) generating a trigger signal when the beam intensity signal crosses a trigger threshold, and (iii) determining a size of the tool feature using the trigger signal generated in step (ii), wherein the method comprises a step of applying a tool size correction that accounts for the nominal tool diameter of the tool feature being less than the beam width. The method may be used for tool length correction and may include any of the features described herein.

The invention will now be described, by way of example only, with reference to the accompanying drawings, in which.

Figure 1:
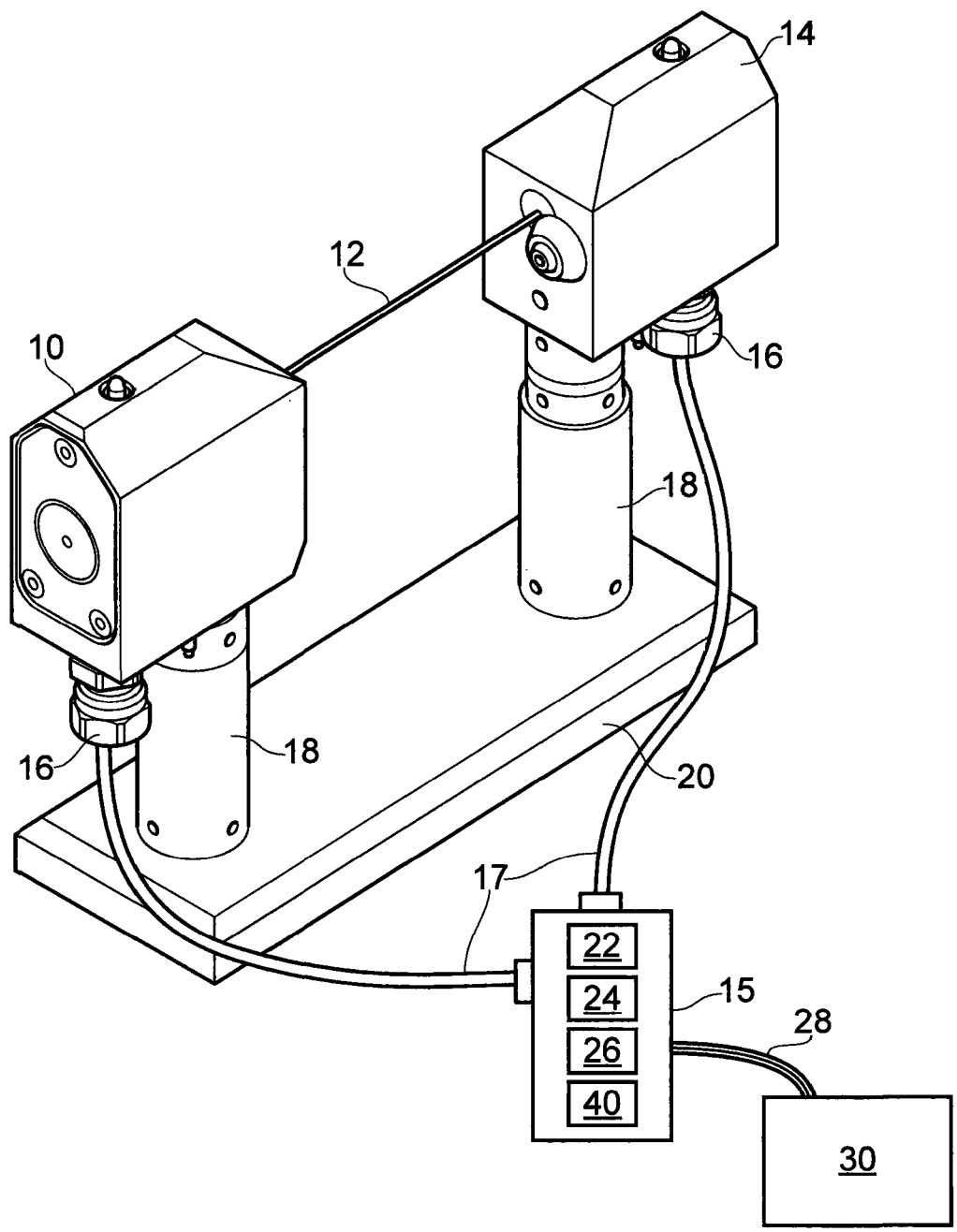
FIG. 1 shows a non-contact tool setting apparatus of the present invention.

Referring to FIG. 1, a tool setting apparatus of the present invention is illustrated. The apparatus comprises a transmitter 10 for generating a substantially collimated beam of light 12. The transmitter 10 includes a laser diode and suitable optics (not shown) for generating the collimated beam of light 12. A receiver 14 is also illustrated for receiving the beam of light 12. The receiver comprises a photodiode (not shown) for detecting the beam of light 12.

The transmitter 10 and receiver 14 are both affixed to a common base 20 by pillars 18. This arrangement ensures the transmitter 10 and receiver 14 maintain a fixed spacing and orientation relative to one another. The base 20 may then be mounted directly to the bed, or indeed any appropriate part, of a machine tool. It should also be noted that various alternative structures for mounting the transmitter and receiver could be used. For example, a common housing for the transmitter and receiver could be provided or discrete transmitter and receiver units could be separately mounted to the machine tool.

The apparatus also comprises an interface 15 connected to the transmitter 10 and receiver 14 via electrical cables 17. The interface 15 provides electrical power to the transmitter 10 and receiver 14 and also receives a beam intensity signal from the photodiode detector of the receiver 14. The interface 15 also comprises a trigger unit 22 that monitors the beam intensity signal it receives from receiver 14 and issues a trigger signal to an associated machine tool 30 when the beam intensity signal crosses a trigger threshold. The trigger signal of this example comprises a change in status of an output line, but it could also be implemented as an electrical pulse or other known way of communicating to the controller of the machine tool 30. The interface 15 also comprises a tool length correction unit 40, that is described in more detail below.

Prior to use in a tool measurement operation, for example during a set-up or installation process, the transmitter 10 and receiver 14 are aligned relative to one another to maximise the intensity of light falling on the photodiode of the receiver 14. A variable gain amplifier associated with the receiver is then adjusted so that the beam intensity signal takes a value of 5 v in the absence of any blockage of the beam (i.e. with the apparatus in the so-called "beam clear" condition). This 5 v beam intensity signal is set as a reference beam intensity level.

In prior art systems, the trigger unit 22 is then set to have a fixed trigger threshold of 2.5 v (i.e. fifty percent of the reference maximum beam intensity level). Passing an object into the light beam 12 will result in a trigger signal being issued when the beam intensity signal drops below 2.5 v. This trigger signal can thus be used to indicate that an object (e.g. a tool) has attained a certain position relative to the laser beam 12. Although a 50% level is commonly used, thresholds anywhere in the region of 50% or 2.5V could be used.

Figure 2:
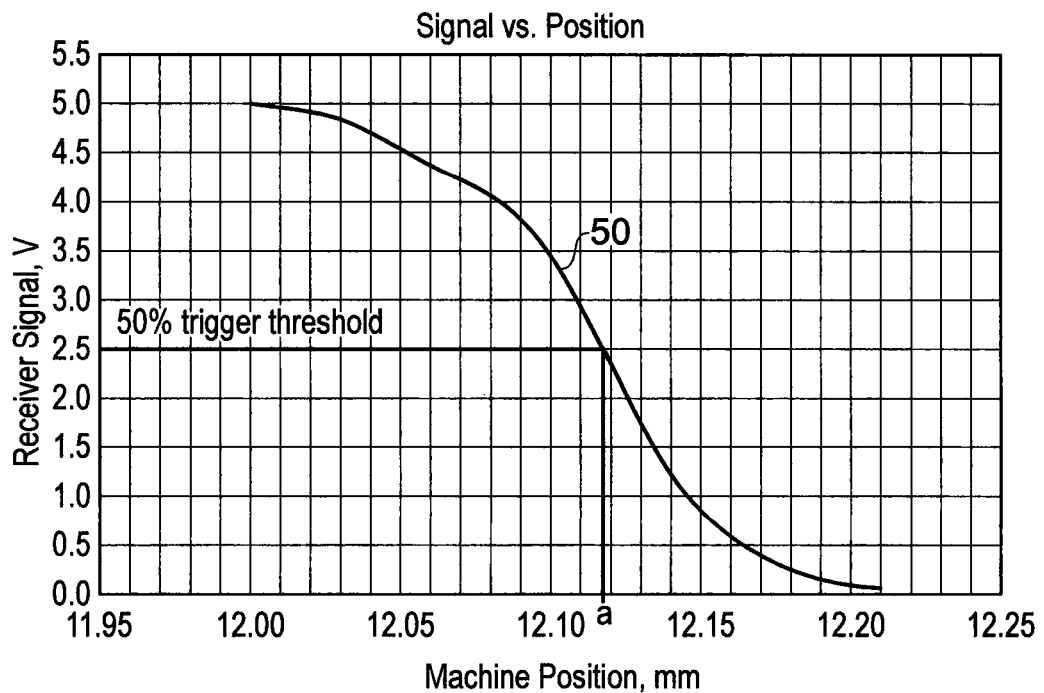
FIG. 2 shows the drop in received light as a pin is moved to obscure the beam.

FIG. 2 demonstrates how the issuance of a trigger signal occurs when passing a large, solid (calibration) pin having an 8 mm diameter into the light beam which has a beam width of less than 8 mm. In particular, the graph of FIG. 2 shows the variation in beam intensity signal (plotted on the y-axis) as a function of the position of the pin as measured by the machine tool (plotted on the x-axis) when the calibration pin is traversed into the light beam along a direction perpendicular to the axis of the light beam. In the absence of any blockage of the light beam (i.e. the so-called "beam-clear" condition) the beam intensity signal takes a value of approximately 5 v and this reduces to 0 v when the beam is fully blocked following an s-shaped curve 50. The use of the 2.5 v (50%) trigger threshold can be seen to give a trigger position for the pin of 12.117 mm. The use of a 50% trigger threshold has been found to provide reliable measurements of tool position when the tool is larger than the beam width of the light beam. However, as will now be described with reference to FIGS. 3a to 3c, a fixed trigger threshold has been found to introduce errors when the tool diameter is smaller than the beam width.

Figures 3A, 3B, 3C:
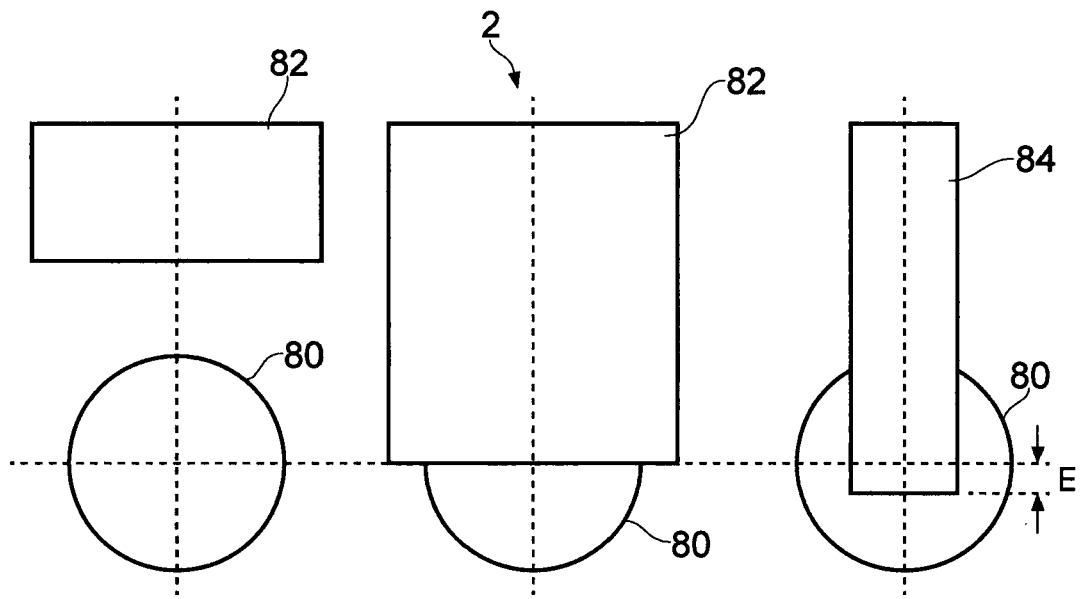
FIG. 3a illustrates a beam clear condition.
FIG. 3b shows a large tool partially obscuring the light beam.
FIG. 3c shows a small tool partially obscuring the light beam.

FIG. 3a shows a light beam 80 generated by the tool setter apparatus described above. The light beam 80 is, to a good approximation, circular and has a Gaussian intensity distribution. As mentioned above, the light beam is collimated and thus has a similar cross-section along its length. FIG. 3a shows the so-called "beam clear" condition in which the tool 82 to be measured is clear of the beam. In this example, 100% of the light passes from the transmitter 10 to the receiver 14.

Referring next to FIG. 3b, the tool 82 is moved into the light beam 80 (along the direction z) by the machine tool. At the point in time the tool reaches the position illustrated in FIG. 3b (i.e. where fifty percent of the light beam 80 is obscured) the trigger unit 22 issues a trigger signal. The machine tool records the measured position of the tool at the instant the trigger signal is received, thereby allowing (with suitable calibration) the position of the tool tip to be determined. The measured tool length of tool 82 can thus be stored and subsequently used when that particular tool is being used in a cutting operation.

Referring to FIG. 3c, the positional error that will arise when using a fixed trigger threshold to measure a tool 84 having a diameter less than the diameter of the light beam 80 is illustrated. Again, during use the tool 84 would be moved (along the direction z) into the light beam 80. However, the tool does not occlude the entire width of the light beam, so the fifty percent trigger condition is not reached when the tool tip reaches the centre of the light beam 80. Instead, the tool 84 needs to pass further into the beam to the position illustrated in FIG. 3c before the trigger signal is issued. The tip position of the tool 84 is thus offset by the distance E from the beam centre; this extra distance E is interpreted by the machine tool as a reduced length of tool 84 (i.e. the machine tool measures the tool 84 to be shorter than it actually is because it needs to be moved further into the beam before the trigger signal is generated). This difference or error between the measured positions of the tips of the tools 82 and 84 results in errors in any parts that are cut using these tools (i.e. because the tool length includes this error).

Figure 4:
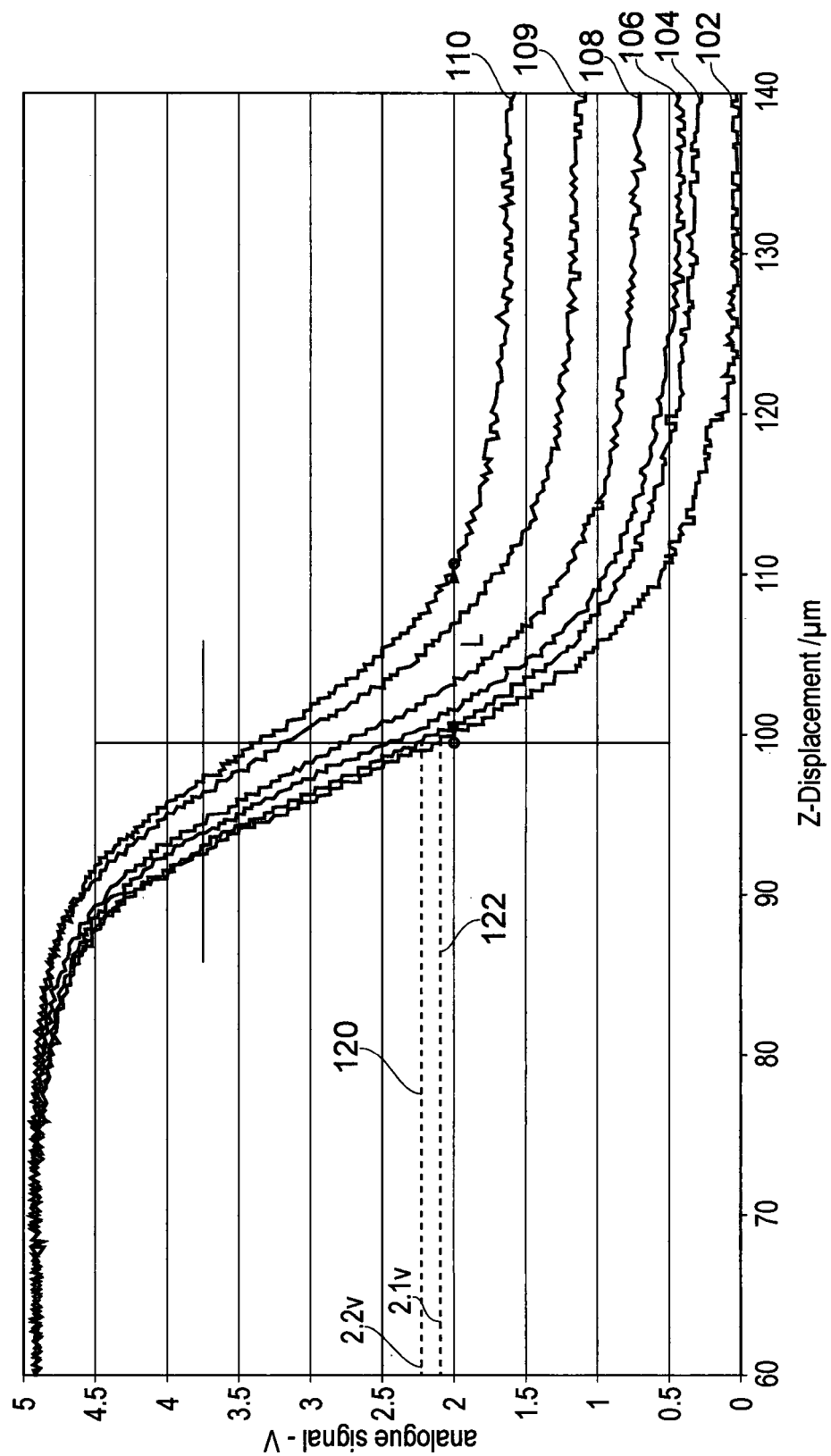
FIG. 4 shows the effect of tool diameter on the received light intensity.

FIG. 4 shows the effect of tool diameter on the beam intensity signal produced as the tool is moved into the light beam. The x-axis (horizontal axis) shows the displacement of the tool relative to the light beam and the y-axis (vertical axis) shows the beam intensity signal in volts. Curves 102, 104, 106, 108, 109 and 110 show the drop in the beam intensity signal when tools having nominal diameters of 100 μm, 70 μm, 60 μm, 40 μm, 30 μm and 20 μm respectively are moved into the light beam. The beam width is less than 100m, but more than 70 μm, so only the largest 100 μm tool will fully obscure the beam when fully inserted into it. The 100 μm tool could be replaced with a calibration pin. If the trigger threshold was set at 2.0 v, it can be seen from FIG. 4 that the measured length of the different diameter tools would include an error L of more than 10 μm.

The trigger unit 22 of the tool length correction unit 40 is instructed to adjust the trigger threshold to remove (or at least reduce) the positional error that is described above. In the present embodiment, the tool length correction unit 40 stores a beam width value and receives nominal tool diameter information from the machine tool 30 relating to the tool to be measured. Prior to measurement of the tool, the tool length correction unit 40 checks if the nominal tool diameter is less than the beam width. For any such tools, a mapping operation is performed by the tool length correction unit 40 to determine the trigger threshold voltage that is required for a trigger signal to be issued when the tip of the tool is located at the same point relative to the beam as the calibration pin. This mapping process is based on using a look-up table of corrections (e.g. taken from data of the type shown in FIG. 4) in the present example. However, the look-up table could also be generated by optically modelling the effect of partially obscuring the beam to obtain suitable mathematical expressions etc. that relate the necessary trigger threshold voltage to tool diameter.

For a tool with a nominal diameter of 70 μm (i.e. which generated curve 104 in FIG. 4) then the tool length correction unit 40 would instruct the trigger unit 22 to issue a trigger signal when the 2.2V threshold is crossed. As shown in FIG. 4, the 70 μm tool and the 100 μm tool are both located in the same z-position in the beam when the beam intensity signal is at 2.2V and 2.1V respectively. In other words, the different trigger thresholds 120 and 122 are crossed with the tool tip located at the same position in the light beam by the 70 μm tool and the 100 μm respectively. In this manner, the tool length correction unit 40 compensates for the reduced beam occlusion that occurs when measuring tools having a diameter smaller than the beam width.

Figure 5:
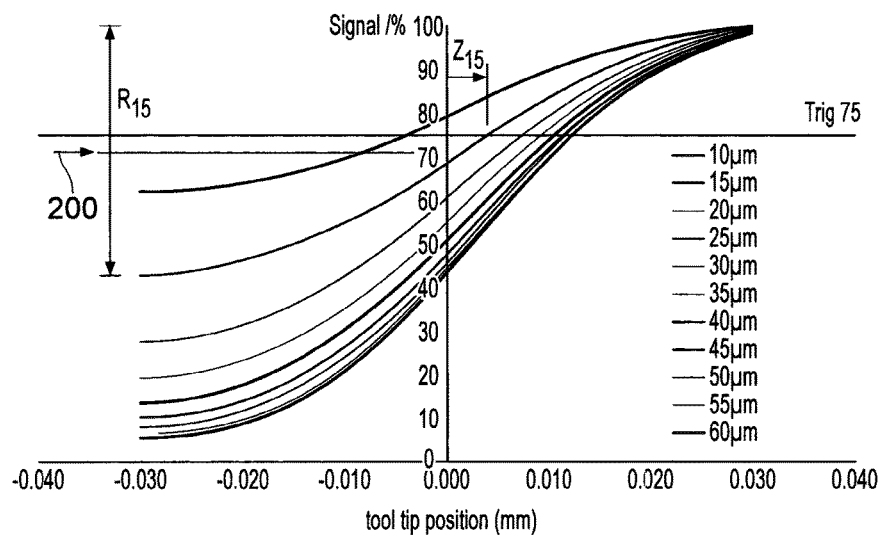
FIG. 5 shows various s-curves for different diameter tools.

Referring to FIG. 5, an example of the "s-curves" produced when measuring a range of different tool diameters is illustrated. An s-curve is a graphical representation of the detector response as a tool in inserted progressively into the optical beam. The simplest case is for a perfectly aligned tool passing through the centre of the beam. The vertical axis of the plot is the detector response (this scale can be in Volts or a percent of the un-obstructed beam response as per FIG. 5) and the horizontal axis is tool displacement, or more conveniently, tip location relative to a desired plane within the optical beam, in units of distance (e.g. microns or millimetres).

It can be seen from FIG. 5 that each s-curve crosses the 75% threshold at different points, leading to different tool tip positions being measured relative to the desired tool tip position (shown as 0.000 in the graph of FIG. 5). An error in tool length is thus present (this is shown as $Z_{15}$ for the 15 μm diameter tool) and the aim of the method described herein is to establish this length error as a function of a measurement or other information dependent on tool diameter.

Figure 6:
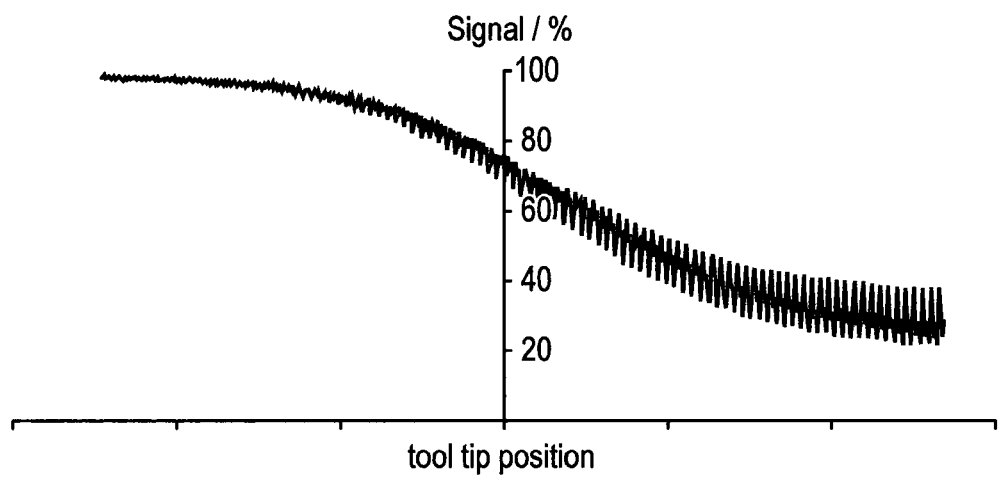
FIG. 6 shows an s-curve for a rotating tool.

Referring next to FIG. 6, it should be noted that the tool will be rotating during many tool length measurements. The various cutting teeth of the tool will therefore be rotating in the beam thereby varying the amount of beam obscuration. FIG. 6 thus illustrates a raw s-curve measurement for a spinning 50 μm diameter tool in which the alternating current (AC) component is due to the tool flutes. To avoid processing errors due to the flutes, the raw s-curve can be smoothed by considering just the minima value per revolution of the tool, before extracting calibration data.

Figure 7:
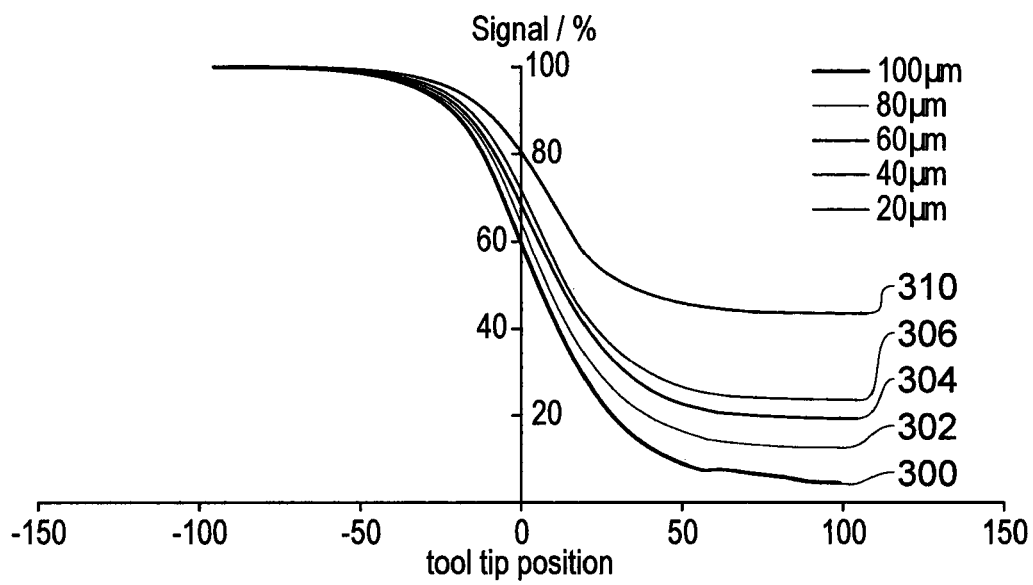
FIG. 7 shows a series of smoothed s-curves.

FIG. 7 illustrates a series of smoothed s-curves generated using the minima values extracted as the tool is rotated. Curves 300, 302, 304, 306 and 310 relate to tools of diameter 20 μm, 40 μm, 60 μm, 70 μm and 110 μm. The smoothing process used to generate these s-curves was performed by passing a moving average (5 minima wide) over the minima data to produce the illustrated family of curves.

Figure 8:
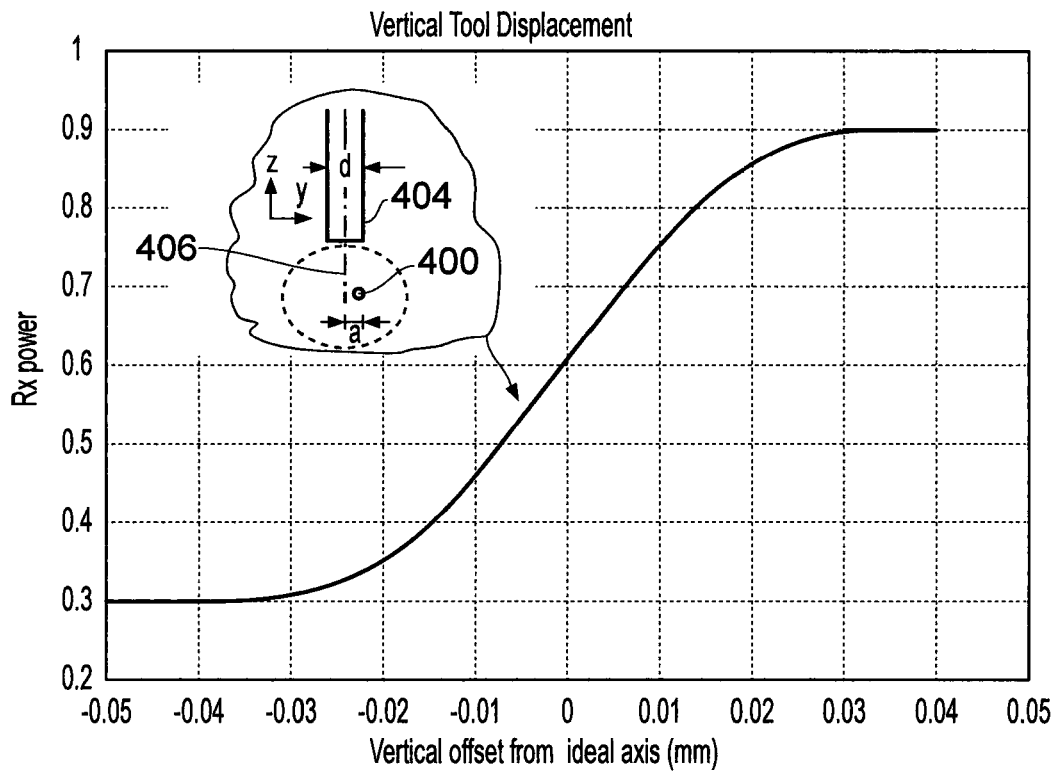
FIG. 8 illustrates the effect of tool offset and tool diameter variations.

Referring next to FIG. 8, it will be explained how offsetting a tool relative to the centre of the light beam has a very similar effect on the s-curves to using tools of different diameters. The inset to FIG. 8 illustrates a tool 404 of diameter d that is moved downwards (i.e. along the z-axis) into a light beam 402 having a beam centre 400. The tool 404 has a long axis 406 laterally offset from the beam centre 400 by the distance a. The graph of FIG. 8 shows four overlapping s-curves that are almost indistinguishable from each other. The four s-curves were generated for a first tool (d=18 μm, a=0), second tool (d=20 μm, a=6.1 μm), third tool (d=25 μm, a=9.5 μm) and a fourth tool (d=30 μm, a=12 μm). As will be explained in more detail below, this effect is important because it means any calibration data extracted from an s-curve is valid for any tool diameter/tool offset combination which produces that s-curve. This means the calibration equation described below which represents extracted data from a series of s-curves thus remains essentially valid for a range of on and off-axis tools.

Figure 9:
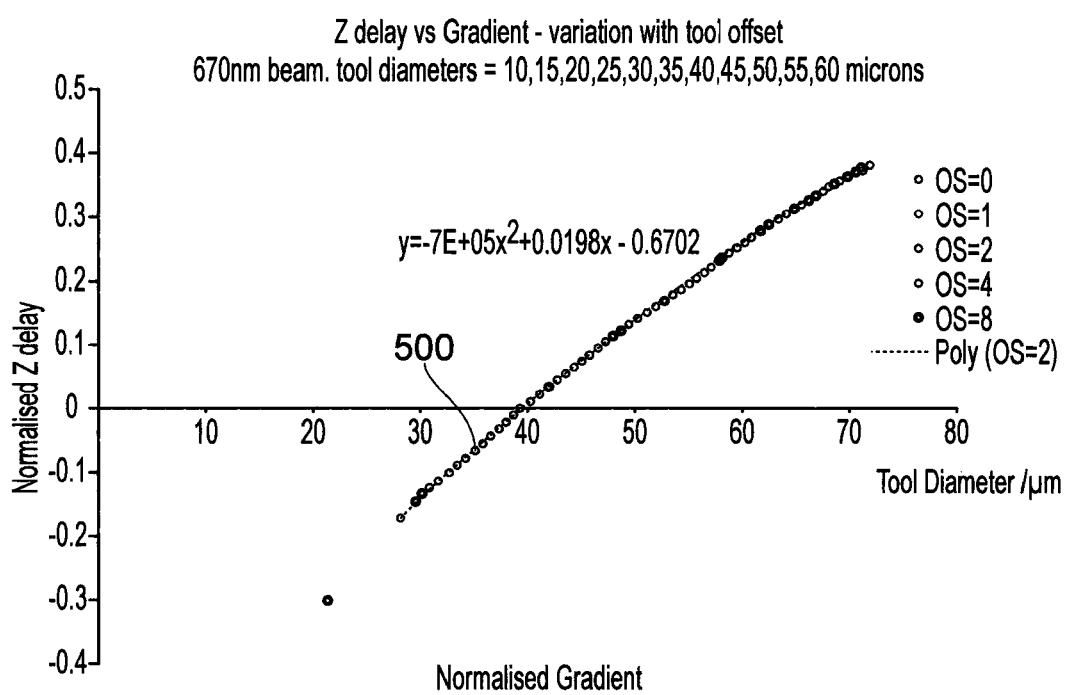
FIG. 9 shows tool offset versus tool diameter measurements with a polynomial fitted thereto.

Referring next to FIG. 9, it is illustrated how a tool length correction relates to the gradient of the s-curve in the region of 75% threshold. In this example, the tool length correction is expressed as a trigger delay on the vertical axis and s-curve gradient in the region of a 75% threshold (which is dependent on tool diameter) is plotted on the horizontal axis. The trigger-delay is plotted as a function of s-curve gradient (in the region of 75% threshold) for tool widths from 10 µm to 60 µm (in 5 µm steps) and for tool lateral-offsets (i.e. distance "a" in FIG. 8) from 0 to 8 µm (in 1 µm steps). It should be noted that these curves are plotted in normalised units, as described in more detail below, but it can be seen that on-axis and off-axis s-curves give rise to a common calibration equation or relationship (i.e. as shown by the plotted line 500).

To summarise, each of the s-curves described above represents the detector response as a tool in inserted progressively into the optical beam. The simplest case is a perfectly aligned tool passing through the centre of the beam, but as illustrated in 8, very similar s-curves are produced by different width tools with moderate lateral offsets. This can be highly advantageous from a practical perspective because it greatly relaxes optical alignment constraints for the tool setter apparatus. As would be expected, the form of the s-curves and indeed the tolerance of the s-curves to lateral offset will vary somewhat with the geometry of the optical tool-setter due to optical diffraction effects. For example, a tool setting apparatus of the type described with reference to FIG. 1 may have a 55 mm long optical beam of 670 nm light (light beam 12), passing through a 0.6 mm diameter source aperture (i.e. in transmitter 10) and slightly converged to maximise the signal strength entering a receiver aperture of diameter 0.6 mm (i.e. in receiver 14). The use of such near collimated beams are advantageous for various reasons (e.g. optical cost, resistance to airborne contamination etc) but the same effect would occur in other optical arrangements, such as those that comprise tightly convergent (focussed) or divergent light beams.

It will next be described how to implement a tool length correction, before further details are provided about how to perform the calibration.

In a first embodiment, all tool length correction operations occur during a single pass of the tool into the beam. The tool length correction would thus be transparent to the user and would externally appear similar to any large-tool measurement operations. To achieve this, it is possible to observe a "feature" of the detected s-curve signal in order to estimate the s-curve being executed and to calculate therefrom the tool length correction that needs to be applied. This correction can then be used to issue a trigger pulse to the machine controller as soon the tool tip reaches the beam optical axis (i.e. the z=0 position shown in FIG. 5).

One way to achieve the above aim is to observe the S-curve gradient at a high signal level (assuming a constant feed-rate). For example, the s-curve gradient could be determined at, say, a 75% threshold of the unobstructed signal (beam clear) level. The measured S-curve gradient at the 75% threshold could then to be used as an ordinate in a calibration equation or converted to a look-up table address to deduce the tool-position offset (dz) from the threshold crossing point to the z=0 (trigger issue) point. For illustration, the offset dz for a 15 µm tool is labelled $Z_{15}$ in FIG. 5. It should be noted that the value dz or an indication of the gradient at the 75% threshold could be sent directly to the machine controller as a correction, or the trigger signal produced by the non-contact tool setter could be adapted to provide the dz correction (e.g. by altering the trigger threshold or trigger delay).

An alternative "modulation depth" technique is also possible in which the tool may be inserted in the light beam twice. In a first measurement step the tool is inserted fully into the light beam (i.e. so it passes from one side of the beam to the other) and the beam intensity signal is measured. The beam intensity for such a fully inserted tool is termed the "remnant light level" and this has been found to provide a reliable indication of the tool diameter. In FIG. 5, the reduction in beam intensity from the beam clear value to the remnant light level for the 15 µm tool is labelled $R_{15}$.

Figure 10:
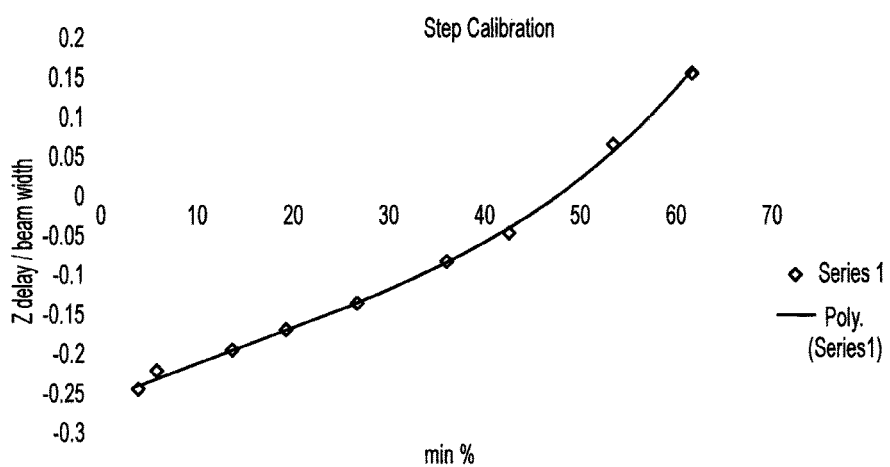
FIG. 10 shows the tool length error as a function of the remnant light level.

FIG. 10 shows the z-delay or dz value (i.e. the error in tool tip position) for a given beam width as a function of the remnant light level (expressed as a percentage of the beam clear value) for a plurality of tools of different diameter. It can be seen that the relationship follows a curve that can conveniently be described by a low order polynomial.

It is thus possible to obtain a tool length correction from the remnant light level. The tool may then be withdrawn from the light beam and re-inserted for the second measurement step. Alternatively, the second measurement step may simply occur as the tool is withdrawn. The tool length correction calculated from the remnant light level may be used to adjust the trigger threshold that is applied during the re-insertion of the tool into the beam. In this manner, the trigger signal issued during the re-insertion may be corrected for the tool diameter being less than the beam width. If it is desirable to avoid the need to calculate a calibration polynomial, the trigger threshold may simply be set approximately halfway between the beam-clear and remnant light levels for the subsequent measurement (as shown by level 200 in FIG. 5).

It will now be explained how calibration data can be collected. In particular, the following procedure was used to measure the s-curves for a range of micro-tools of different diameter. In this calibration process, each of a range of different diameter tools was measured in turn.

As an overview, the action of calibration typically involves at least some of the following steps:

A) Generating a family of s-curves representing real measurement for a range of tools representative of the tool widths to be applied in operation of the tool setting apparatus.

B) Identifying and measuring a "feature value" from each s-curve that is dependent on the tool-width (or more correctly the ratio of the tool width relative to the beam width). This feature value should be suitable for automatically identifying which s-curve is being executed from analysis of the detector signal during operation of the tool setting apparatus.

C) Selecting and measuring a tool length correction for each s-curve. This should be suitable for tool-length correction using the selected correction technique (whether that is adjusting the trigger delay, a trigger threshold adjustment, calculating a length correction/offset for communication to the controller etc).

D) If length-correction for s-curves other than those measured (e.g. as per step A) are required, then it is also possible to formulate an interpolation/extrapolation method (e.g. a calibration equation) that is suitable for deriving a length correction value from a continuous range of feature values or alternative s-curve identifiers. These additional length corrections may be calculated during operation or previously communicated. This would allow, for example, the measurement of tools having diameters different to those measured during the s-curve generation process (step A).

To obtain calibration data, a second optical sensor (in this example a camera with a high magnification lens) was used for reference purposes. Although using a camera is convenient, it should be noted that any suitably accurate displacement sensor could be used. Initially a large diameter flat-bottom tool (such as an end-mill) was brought down onto the light beam of the NC tool setter until it triggered. The end-mill was held at "trigger-level" and viewed by the camera. This tells the camera the vertical location of the "large-tool trigger plane" To avoid parallax errors, the camera axis was set in the desired "depth" (e.g. the large tool trigger) plane perpendicular to the tool motion. It is not essential to set-up the calibration (i.e. $Z_0$) to operate in the large tool trigger plane, but this is a convenient choice for most applications.

The test was then started by putting a first micro-tool in the spindle of the machine tool. The micro-tool was passed into the light beam of the tool setter and using the camera it was observed when the tip is at the "large-tool trigger plane". The machine scale value (e.g. termed Z0) was measured at this point. The micro-tool was then backed off (i.e. retracted from the light beam) and moved back into the light beam whilst recording both the beam intensity signal and the machine scale (z) values. The value Z0 was subtracted from the scale (z) values and the beam intensity signal was plotted vertically and the corrected scale values horizontally. The value of z=0 thus corresponded to the "large-tool trigger plane". The z-value was also noted at which the beam intensity signal equalled the threshold value (e.g. the 75% threshold); this z-value is the z-offset for this tool. The z-offset thus describes the tool length correction that needs to be applied for this particular s-curve (i.e.to account for the tool width being less than the beam width etc). The purpose of the tool length correction value (i.e. the z-offset) is to inform the machine-tool when the tool-tip is located at a particular depth into the optical beam. The particular depth that is used for the correction is selectable and it should be noted that it doesn't have to be the same for all tools. However, for simplicity, a constant depth may be used for all the tools (this is the case for the various embodiments described herein).

The concept associated with establishing a tool length correction can be further explained by briefly referring again to FIG. 5. FIG. 5 shows a z-offset labelled as Z15, which is the tool-offset at the time the intensity curve for a 15 μm tool crosses the 75% threshold. This Z15 value is thus an example of a "correction value". In the example of FIG. 5, the Z15 value is a quantity (e.g. a value in micro-meters) that could be communicated to the controller to correct its scale readings as recorded at the time of trigger issue. Clearly each s-curve shown in FIG. 5 would have a unique tool-offset value.

Passing information about the tool-offset value ($O_s$) to the controller of a machine tool is not always possible or practical. Instead, the interface to the machine-tool could be simplified by applying a trigger-delay (i.e. by retarding the issuance of the trigger signal to the machine tool controller) to provide the required tool length correction. It should be noted that such a technique does require the tool feed-rate ($V_f$) to be known. The required trigger delay ($t_d$) is then simply the tool-offset ($O_s$) divided by the feed-rate ($V_f$); the feed-rate being a known constant (or average) feed-rate value. This trigger delay parameter ($t_d$) allows the tool-setter to issue a trigger to the machine tool at the correct time after the trigger was initially generated (i.e. to implement the tool length correction). Another way to implement a tool length correction, again without having to alter the interface between the non-contact tool setter and the machine tool controller, is to alter the trigger-level (i.e. the threshold level at which trigger signal is issued). This can be done by using the camera to position the tool-tip in the large-tool plane (i.e.

at the desired depth). The received signal level then represents the threshold at which, in operation, a trigger is issued to the machine-tool. There are, of course, other ways in which such tool length corrections could be implemented in practice.

As well as establishing the z-offset, an "s-curve feature value" was also noted for this first micro-tool (i.e. as per step B above). The s-curve feature value may be the modulation depth; i.e. the beam intensity signal when the tool is fully inserted into the beam relative to the beam clear signal. The modulation depth can also be termed the maximum obscuration (and may be based on the signal remaining or the signal removed). Alternatively, the s-curve feature value may be the gradient in the region of a defined signal level (e.g. the gradient in the region of the trigger threshold) or any other measurement dependent on effective tool width to beam width. The feature-value and z-offset value(s) were recorded for this first tool.

It should be noted that tool-width dependent feature values other than those described above may be used. These may include use of an average gradient, an area under the curve, or the delay between two or more signal levels (for a known (or constant) tool feed-rate). The primary purpose of the tool-width dependent feature value is to label or identity which s-curve is being executed. Because the feature value is simply an s-curve identifier, it could also (if required) be replaced by prior knowledge or externally communicated information.

The test process described above for the first micro-tool was then repeated for a plurality of micro-tools of different diameter. The s-curve feature value and z-offsets were thus recorded for all tools in the tool-set. It should be noted that it is not necessary to record (save) the s-curve data; instead, it could be processed in real (or semi-real) time. It is also unnecessary to measure the whole s-curve, it's enough to measure just the s-curve feature value and the correction value (z-offset).

After collecting the feature values (e.g. curve gradient) and associated correction values (e.g. z-offset) for multiple micro-tools (i.e. steps A to C described above), there exists a discrete set of length correction value and feature value pairs. The number of such value-pairs corresponds to the number of unique S-curves that have been generated in step A.

It will now be described how to apply the above described value-pairs in practice (i.e. in accordance with step D above).

If the environment and stability of the equipment and measurements is adequately controlled and only the discrete set (or sub-set) of the currently measured s-curves are relevant, then it is possible to identify a correction value (e.g. z-offset value) that corresponds to the feature value of the S-curve being measured. In this case, a simple look-up table could be used.

If it is desirable to anticipate the length correction value for s-curves which have not been previously measured, a number of methods may be applied. For example, one (albeit crude) approach might be to select the pre-measured value-pair with a feature value closest to the measured feature value. Alternatively, a linear interpolation technique may be used to deduce a modified correction value based on the placement of a measured feature value between its nearest neighbour measured values. The application of cubic splines is also a possibility. In a preferred embodiment, a correction value is expressed as a function of the feature value using a least-squares fit; this produces what is termed herein a calibration equation. The calibration equation for example may describe the correction value as a polynomial series in powers of the feature value. The various numerical methods (linear interpolation, cubic spline, least squares fit etc) described above are known in the field of numerical data processing and further details are omitted for brevity. If required, further information can be found in the book: "Numerical Recipes; the Art of Scientific Computing", third edition, by W H Press et al, Cambridge University Press (ISBN: 139780521880688).

As will be explained in more detail below, it should be noted that a further step was also performed of recording a beam-width parameter (wc) in order to normalise the S-curves and calibration results relative to beam width. The normalise correction value was then plotted vertically and the normalised feature-value horizontally. A polynomial was then fitted to this data plot using a least-squares routine. The fitted polynomial expression is thus the normalised calibration equation. The beam-width (wc) that was used during the calibration is also retained as necessary to allow for scaling of the correction value as a function of beam-width when subsequently using the calibration equation.

After the polynomial calibration equation has been established, it may be used to correct tool length measurements as follows. As a first step, a beam width parameter (w) may be measured and an s-curve feature-value is then measured. If necessary, this s-curve is normalised with the beam-width parameter (as described below). Subject to desired accuracy, the resulting calibration equation is valid for a wide variation (e.g. +/−50%) of beam widths and can then be used to produce a corrected z-offset using the measured beam width parameter (w). It should be noted that if, for example, the tool-setter has limited processor capability, it may be convenient to pre-calculate (i.e. using the calibration equation) a sufficiently large set of value-pairs that are stored in a look-up table. The s-curve feature values may be used to generate the look-up table address. This corrected z-offset may then be applied as appropriate (e.g. by altering the trigger threshold, trigger delay etc as described in more detail above).

It should also be noted that much of the S-curve form results from the fact that the tool blocks a certain percentage of the beam area. For the spot size variations that are likely to occur in a non-contact tool setter production line or product life, the s-curve feature value indicative of effective tool width to beam width, once normalised to the beam width measurement, yields a calibration equation valid for a range of beam widths. Subject to desired accuracy, normalisation using a first order scaling to account for beam width appears appropriate for beam variations of up to +/−50%.

Figure 11:
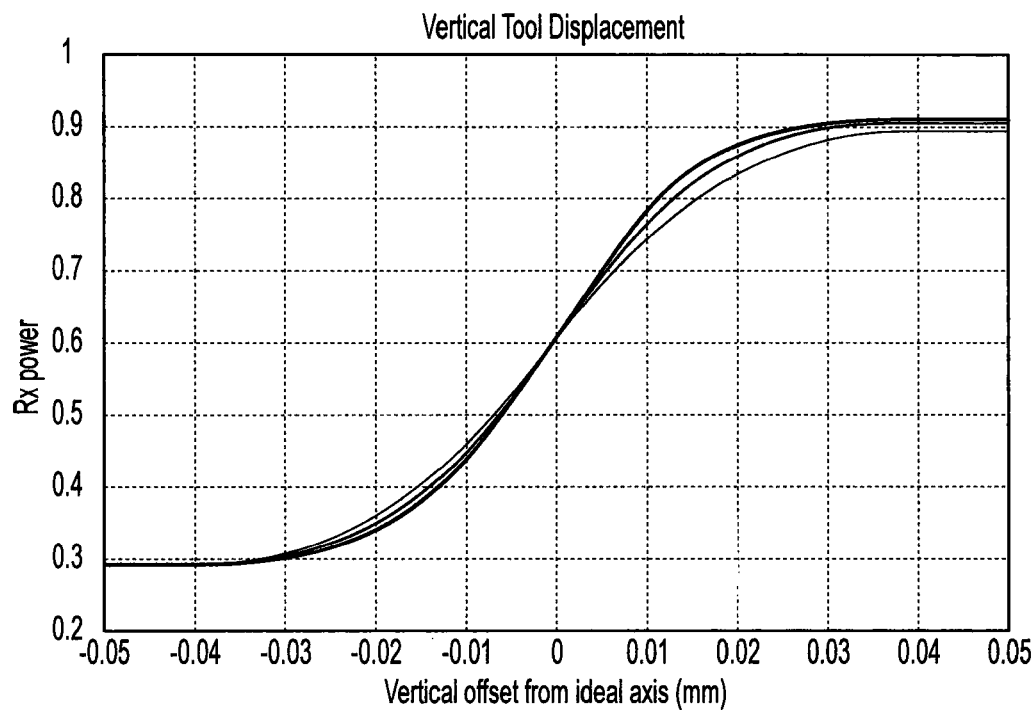
FIG. 11 illustrates the scaling of beam and tool widths.

Referring to FIG. 11, it will be explained how beam-width variation issues can be overcome by normalising the s-curves to the current beam-width prior to application.

Deriving a calibration equation (or other method) is a time consuming and skilled process. It is thus of great practical benefit to be able to apply a single calibration to not just a single tool-setter throughout its life, but to other tool-setters of similar form. Starting with an s-curve plot of detector response vs tool tip offset, a calibration will lose its validity as the beam width varies. Beam width variation can occur in the short term, if the operator applies tools at the wrong axial position along the beam (since even collimated beams have a gentle convergent-divergent profile), or on a longer timescale, due to ambient temperature and source wavelength change. Also, tightening opto-mechanical tolerances in an attempt to control the beam width for units coming off a production line would increase the cost of tool setter manufacture.

It has been found that if the optical beam and tool were to scale simultaneously by the same amount, the obscuration of the beam, and hence the signal level, would remain unchanged. This indeed is the case, to a good approximation. FIG. 11 illustrates how diffraction effects lead to only slight deviation from what's expected geometrically for a±10% variation in beam and tool width. But the gradients of the curves are different because (on the horizontal axis) the tool has further to travel through a wider beam etc. The s-curves however remain very similar if the units of the horizontal axis are changed from tool-tip position to tool-tip position divided by an indication of the beam width (w).

Normalised s-curves for calibration are thus plotted with the signal "S" against Z/wc, where Z represents the tip position and wc is an indication of beam width (e.g. 10% to 90% value) at time of calibration. It is then possible to produce a normalised calibration equation (or other) for use in operation. In operation, the normalised feature value would be substituted as a variable into the normalised calibration equation; the feature value being derived in normalised units (Z/s, S) where w is the current value of the beam-width indicator.

If the output of the calibration equation has been defined to relate to the horizontal axis of a normalised s-curve (offset or delay) it would naturally (but not essentially) be expressed in terms of Z/Wc which can be corrected to actual offset (or delay) by multiplying by W. By this method, a single calibration equation can reliably be applied to a very large number of tool-setter units. If however the feature value is signal level based (e.g. obscuration level) and so too is the correction value (e.g. adjusted trigger level), then normalisation will not be required. Since any compression or expansion of the horizontal axis will have no effect on either value.

Figure 12:
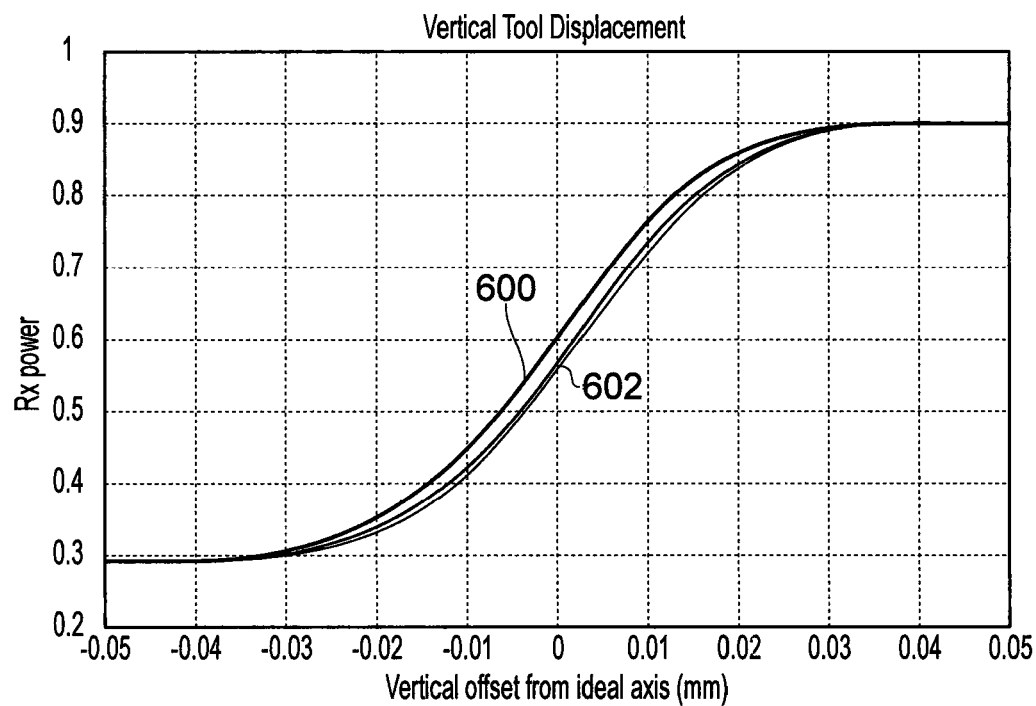
FIG. 12 shows s-curves for tools having different tip profiles.

Referring to FIG. 12, it should also be noted that tool-tip form may give rise to a tool length measurement errors. FIG. 12 shows a first set of s-curves 600 from ball and 120° tip tools and a second set of s-curves 602 from flat tipped tools. Although the mid fall gradients are very similar, the different geometry tips have different rates of change of gradient in the curved regions. An s-curve feature-value in the form of the signal gradient in the curved region of the s-curve could thus be used to differentiate tool-tip. This would allow an s-curve to be identified and the tool length correction then follows in a similar manner to that described above.

As explained above, although the majority of the above examples describe altering the trigger threshold to perform the tool length correction, it would be possible to perform the correction in a variety of other ways. For example, the trigger delay (i.e. the time between the trigger threshold being crossed and the issuance of the trigger signal to the machine tool) could be varied to implement the tool length correction. A certain trigger delay could be provided when the tool diameter exceeds the beam width, and this trigger delay could be reduced when the tool diameter is less than the beam width. This effectively advances the trigger signal in time to compensate for the smaller diameter tool. It would also be possible for the tool length correction to be performed as a separate step after an initial tool length measurement has been made. For example, an uncorrected tool length measurement could be made that ignored the effect of tool diameter. A correction value could then be calculated (e.g. using data of the type shown in FIG. 4) that is combined with the uncorrected tool length measurement to generate a corrected tool length.

The invention claimed is:

1. A method for tool length measurement using a non-contact tool setting apparatus mounted to a machine tool, the non-contact tool setting apparatus comprising a transmitter for emitting a light beam having a beam width and a receiver for receiving the light beam, the receiver generating a beam intensity signal describing the intensity of received light, the method being for measuring the length of a tool having a nominal tool diameter less than the beam width such that fully inserting the tool into the light beam only partially occludes the light beam, the method comprising the steps of;
   (i) moving the tool through the light beam thereby causing a change in the beam intensity signal,
   (ii) generating a trigger signal that indicates the beam intensity signal has crossed a trigger threshold, and
   (iii) determining the length of the tool using the trigger signal generated in step (ii),
   wherein the method comprises a step of applying a tool length correction that accounts for the nominal tool diameter being less than the beam width.

2. A method according to claim 1, wherein the step of applying a tool length correction comprises adjusting the trigger threshold that is applied in step (ii), the trigger threshold being adjusted so that the amount of obscuration of the light beam required for a trigger signal to be generated is reduced for smaller diameter tools.

3. A method according to claim 2, wherein the step of applying a tool length correction causes the trigger signal of step (ii) to be generated when the tips of tools having different tool diameters are located at substantially the same position within the light beam.

4. A method according to claim 1, wherein step (ii) comprises providing a trigger delay between the trigger threshold being crossed and the issuance of the trigger signal to the machine tool, wherein the step of applying a tool length correction comprises reducing the trigger delay for smaller diameter tools.

5. A method according to claim 1, wherein step (iii) comprises calculating an uncorrected tool length and the step of applying a tool length correction comprises applying a tool length correction value to the calculated uncorrected tool length.

6. A method according to claim 1, wherein the step of applying a tool length correction comprises calculating the tool length correction by referring to a calibration equation or look-up table that describes a relationship between the required tool length correction and the effective tool diameter.

7. A method according to claim 6, wherein the step of applying a tool length correction comprises a step of assessing the effective tool diameter from changes in the beam intensity signal that occur as the tool is moved through the light beam.

8. A method according to claim 7, wherein the step of assessing the effective tool diameter comprises measuring the beam intensity signal when the tool is fully inserted into the light beam thereby partially occluding the light beam.

9. A method according to claim 6, comprising the step of deriving the calibration equation or look-up table describing the relationship between the required tool length correction and the effective tool diameter.

10. A method according to claim 9, wherein the step of deriving the calibration equation or look-up table comprises measuring the change in the beam intensity signal that occurs as a plurality of tools of different width are moved through the light beam.

11. A method according to claim 10, wherein the step of deriving the calibration equation or look-up table comprises identifying a feature related to the effective tool diameter from the change in the beam intensity signal that occurs when each of the plurality of tools are moved through the light beam.

12. A method according to claim 1, wherein the step of applying the tool length correction is performed entirely by the non-contact tool setting apparatus.

13. A method according to claim 1, comprising the step of applying an adjustment to account for any variation in the intensity of light received at the receiver when no tool is located in the light beam relative to a reference light level.

14. A method according to claim 1, wherein the tool is moved, by the machine tool, into or out of the light beam in a direction along the length of the tool and in a direction perpendicular to a direction of the light beam.

15. An apparatus for performing non-contact tool measurement on a machine tool, comprising;
   a transmitter for emitting a light beam having a beam width,
   a receiver for receiving the light beam and generating a beam intensity signal describing the intensity of light received at the receiver, and
   a trigger unit for analyzing the variation in the beam intensity signal that occurs when a tool having a nominal tool diameter is moved through the light beam, the trigger unit generating a trigger signal when the beam intensity signal crosses a trigger threshold, the trigger signal being usable by the machine tool to determine a length of the tool,
   wherein the apparatus comprises a tool length correction unit that applies a tool length correction when the nominal tool diameter is less than the beam width.

16. An apparatus according to claim 15, wherein the tool length correction unit applies the tool length correction by adjusting the trigger threshold of the trigger unit or delaying issuance of the trigger signal to the machine tool.

17. An apparatus according to claim 15, wherein the trigger unit analyzes the variation in the beam intensity signal that occurs by the tool being moved, by the machine tool, into or out of the light beam in a direction along the length of the tool and in a direction perpendicular to a direction of the light beam.

* * * * *